United States Patent
Ikeno et al.

(10) Patent No.: US 10,269,349 B2
(45) Date of Patent: Apr. 23, 2019

(54) VOICE INTERACTIVE DEVICE AND VOICE INTERACTION METHOD

(71) Applicant: TOYOTA JIDOSHA KABUSHIKI KAISHA, Toyota-shi, Aichi-ken (JP)

(72) Inventors: Atsushi Ikeno, Kyoto (JP); Muneaki Shimada, Nerima-ku (JP); Kota Hatanaka, Kama (JP); Toshifumi Nishijima, Kasugai (JP); Fuminori Kataoka, Nisshin (JP); Hiromi Tonegawa, Okazaki (JP); Norihide Umeyama, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/658,966

(22) Filed: Jul. 25, 2017

(65) Prior Publication Data

US 2018/0033432 A1 Feb. 1, 2018

(30) Foreign Application Priority Data

Aug. 1, 2016 (JP) .................. 2016-151130

(51) Int. Cl.
| | |
|---|---|
| *G10L 15/00* | (2013.01) |
| *G10L 15/22* | (2006.01) |
| *G10L 17/22* | (2013.01) |
| *G10L 15/18* | (2013.01) |
| *G10L 15/30* | (2013.01) |

(52) U.S. Cl.
CPC .......... *G10L 15/22* (2013.01); *G10L 15/1815* (2013.01); *G10L 15/30* (2013.01); *G10L 17/22* (2013.01); *G10L 2015/227* (2013.01)

(58) Field of Classification Search
CPC ......... G10L 15/00; G10L 15/01; G10L 15/08; G10L 15/18; G10L 15/1815; G10L 15/1822; G10L 15/22; G10L 15/24; G10L 15/30
USPC ....... 704/231, 235, 236, 239, 243, 244, 251, 704/255
See application file for complete search history.

(56) References Cited

U.S. PATENT DOCUMENTS

| | | | |
|---|---|---|---|
| 2016/0037311 A1* | 2/2016 | Cho ...................... | G06Q 10/00 455/466 |
| 2016/0343372 A1* | 11/2016 | Motomura ............... | G06F 3/16 |
| 2018/0040317 A1* | 2/2018 | Mochizuki ............. | G10L 15/20 |

FOREIGN PATENT DOCUMENTS

| | | |
|---|---|---|
| JP | 2001-188779 A | 7/2001 |
| JP | 2003-117866 A | 4/2003 |
| JP | 2004-090109 A | 3/2004 |
| JP | 2013-142911 A | 7/2013 |

(Continued)

*Primary Examiner* — Qi Han
(74) *Attorney, Agent, or Firm* — Oliff PLC (57) ABSTRACT

A voice interactive device that interacts with a user by voice, the device comprises a voice input unit that acquires and recognizes voice uttered by a user; a degree-of-intimacy calculating unit that calculates a degree of intimacy with the user; a response generating unit that generates a response to the recognized voice, based on the degree of intimacy; and a voice output unit that outputs the response by voice, wherein the degree-of-intimacy calculating unit calculates a degree of intimacy with the user based on a sum of a first intimacy value calculated based on a content of an utterance made by the user and a second intimacy value calculated, based on the number of previous interactions with the user.

6 Claims, 5 Drawing Sheets

(56) References Cited

FOREIGN PATENT DOCUMENTS

JP      2013-206389 A    10/2013
JP      2016-071050 A    5/2016

* cited by examiner

FIG. 1

DEGREE-OF-INTIMACY TABLE

| USER ID | FIRST INTIMACY VALUE | SECOND INTIMACY VALUE | TIME AND DATE OF LAST INTERACTION | COEFFICIENT |
|---|---|---|---|---|
| A001 | 30 | 20 | 2016/6/14 11:20 | 0.1 |
| A002 | ... | ... | ... | ... |
| A003 | ... | ... | ... | ... |
| ... | | | | |

VOICE INTERACTIVE DEVICE AND VOICE INTERACTION METHOD

BACKGROUND OF THE INVENTION

Field of the Invention

The present invention relates to a device which interacts with a person by voice.

Description of the Related Art

In recent years, robots which provide various kinds of information by interacting with a person are being developed. In particular, many communication robots are being developed which process voice input through a microphone and which returns a voice response to the input. In addition, attempts are being made to impart simulated emotions to a robot to enable the robot to interact in a more human-like manner.

For example, a robot described in Japanese Patent Application Laid-open No. 2004-090109 is characterized in that a degree of intimacy is calculated based on the number of interactions and a total time of the interactions and that a response to a user is changed based on the calculated degree of intimacy. In addition, a robot described in Japanese Patent Application Laid-open No. 2001-488779 is characterized in that the robot determines a degree of intimacy based on contents of an utterance made by a user to the robot and returns an appropriate response.

SUMMARY OF THE INVENTION

Generally, when a person communicates with another person, a degree of intimacy with respect to the other person varies significantly depending on how the two persons were previously in contact with each other. However, since interactive robots in conventional art only calculate a degree of intimacy based on limited elements, there is a problem in generating responses that are more human-like.

The present invention has been made in consideration of the problem described above and an object thereof is to calculate a degree of intimacy with higher accuracy in a voice interactive device which interacts with a person by voice.

The present invention in its one aspect provides a voice interactive device that interacts with a user by voice, the device comprising a voice input unit that acquires and recognizes voice uttered by a user; a degree-of-intimacy calculating unit that calculates a degree of intimacy with the user; a response generating unit that generates a response to the recognized voice, based on the degree of intimacy; and a voice output unit that outputs the response by voice, wherein the degree-of-intimacy calculating unit calculates a degree of intimacy with the user based on a sum of a first intimacy value calculated based on a content of an utterance made by the user and a second intimacy value calculated, based on the number of previous interactions with the user.

A voice interactive device according to the present invention calculates a first intimacy value based on contents of an utterance made by a user to the device and calculates a second intimacy value based on the number of previous interactions with the user.

The first intimacy value may be calculated based solely on contents of a latest utterance or may be calculated based on contents of a previously-made utterance. In addition, a value calculated based on contents of a previously-made utterance may be updated using a value calculated based on contents of a latest utterance.

In addition, the second intimacy value is calculated based on the number of interactions previously performed by a user with respect to the device. For example, the number of times interactions have been performed or a frequency of interactions in a prescribed period may be used. Alternatively, weighting may be performed using an elapsed time after an interaction.

According to the configuration described above, since a degree of intimacy is calculated according to the two criteria of the contents of interactions and the frequency of interactions, a degree of intimacy which is more human-Like can be calculated.

The voice interactive device according to the present invention may further comprises a storage unit that stores the calculated degree of intimacy, and when an utterance is received from the user, the degree-of-intimacy calculating unit may calculate an amount of variation of the degree of intimacy attributable to the utterance and updates the first intimacy value and the second intimacy value.

While a degree of intimacy may be calculated every time an interaction is performed, a previously-calculated value may be stored to be updated every time an utterance is received from a user. In other words, amounts of variation may be respectively calculated with respect to the first intimacy value and the second intimacy value and each amount of variation. may be updated.

As described above, by applying "an amount of variation of the degree of intimacy attributable to a latest interaction" to a stored degree of intimacy to calculate a latest degree of intimacy, an effect can be obtained in that the degree of intimacy gradually varies as more interactions are performed.

The voice interactive device according to the present invention may further comprises a user identifying unit that identifies a user, and the storage unit may store the degree of intimacy for each user.

For example, a user identifying unit may identify a user based on voice or an image or may identify the user based on an input obtained from the user. A voice print or the like may be used when the user is identified based on voice, and a feature amount extracted from a facial image or the like may be used when the user is identified based on an image. In this manner, by storing and using a degree of intimacy for each user, the degree of intimacy between the device and a user can be calculated more accurately.

Further, the degree-of-intimacy calculating unit may correct an amount of variation of the first intimacy value or the second intimacy value, based on an elapsed time since the last contact with the user.

In real communication, the longer the time from a last contact, the lower the degree of intimacy. In consideration thereof, a calculated amount of variation of a degree of intimacy can be corrected based on the time elapsed from a last contact made between a user and the device. For example, when the time elapsed from making a last contact is longer, the amount of variation of a degree of intimacy may be corrected to a larger extent in a negative direction. Accordingly, communication can be performed in a more human-like manner.

The present invention in its another aspect provides an interaction system comprising a voice interactive device and an interactive server, the voice interactive device includes a voice input unit that acquires voice uttered by a user and that transmits the voice to the interactive server; and a voice output unit that acquires a response to the voice from the interactive server and that outputs the response by voice, and the interactive server includes a voice recognition unit that recognizes the voice uttered by the user; a degree-of-intimacy calculating unit that calculates a degree of intimacy with the user; and a response generating unit that generates a response to the recognized voice, based on the degree of intimacy, and that transmits the response to the voice interactive device, wherein the degree-of-intimacy calculating unit calculates a degree of intimacy with the user, based on a first intimacy value calculated based on a content of an utterance made by the user and a second intimacy value calculated based on the number of previous interactions with the user.

Moreover, the present invention can be identified as a voice interactive device or an interaction system which includes at least a part of the units described above. In addition, the present invention can also be identified as a voice interaction method carried out by the voice interactive device or the interaction system. The processes and units described above may be implemented in any combination thereof insofar as technical contradictions do not arise.

The present invention is capable of calculating a degree of intimacy with higher accuracy in a voice interactive device which interacts with a person by voice.

DESCRIPTION OF THE EMBODIMENTS (First Embodiment)

Hereinafter, a preferred embodiment of the present invention will be described with reference to the drawings.

A. robot according to the present embodiment is a device which acquires an utterance made by a user to perform voice recognition and which interacts with the user by generating a response sentence based on a recognition result and outputting the response sentence.

<System Configuration>

Figure 1:
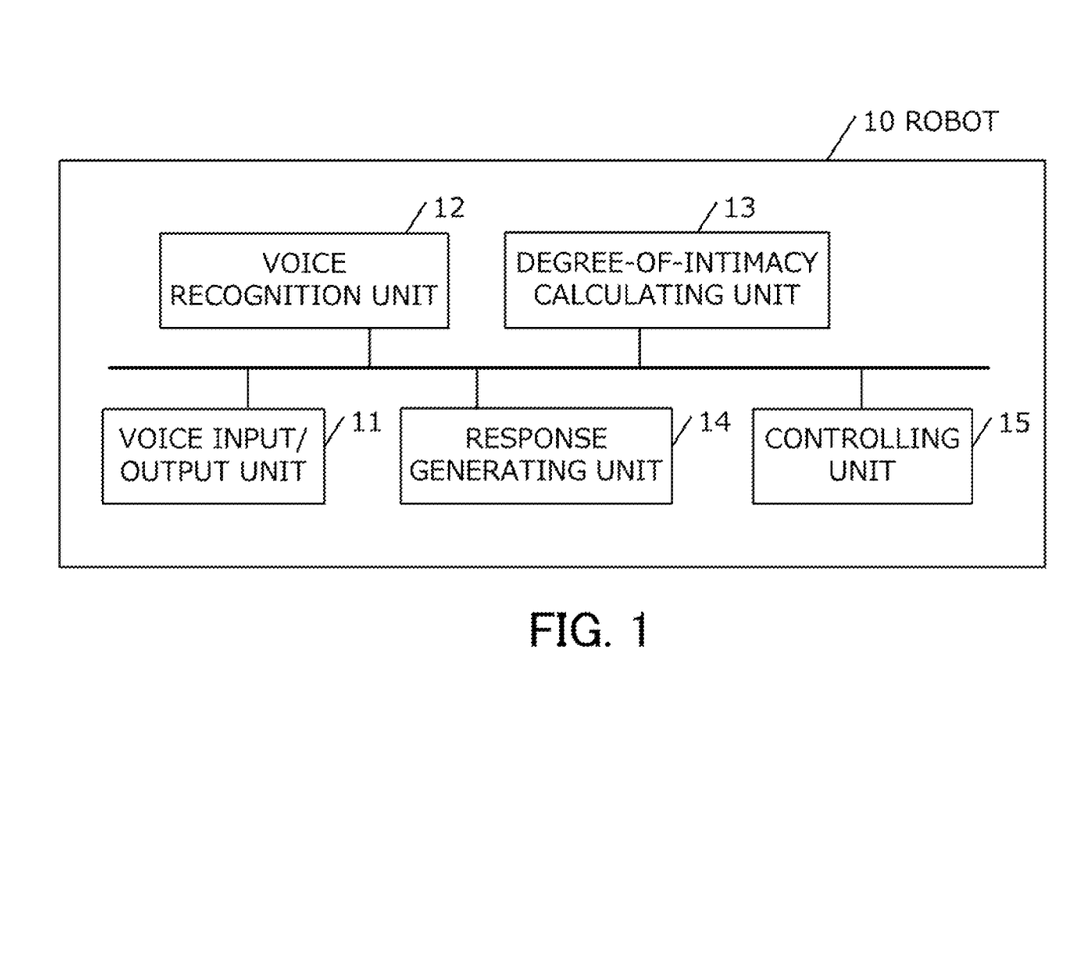
FIG. 1 is a system configuration diagram of a robot according to a first embodiment.

FIG. 1 is a system configuration diagram of a robot 10 according to the present embodiment.

The robot 10 has a function for acquiring voice from the outside, a function for recognizing the acquired voice, a function for acquiring a response to the voice, and a function for outputting the response by voice. While an example of the robot 10 is a communication robot, the robot 10 need not necessarily have a semblance of a character. For example, a general-purpose computer that can be built into a robot may suffice, The robot 10 is constituted by a voice input/output unit 11, a voice recognition unit 12, a degree-of-intimacy calculating unit 13, a response generating unit 14, and a controlling unit 15.

Figure 5:
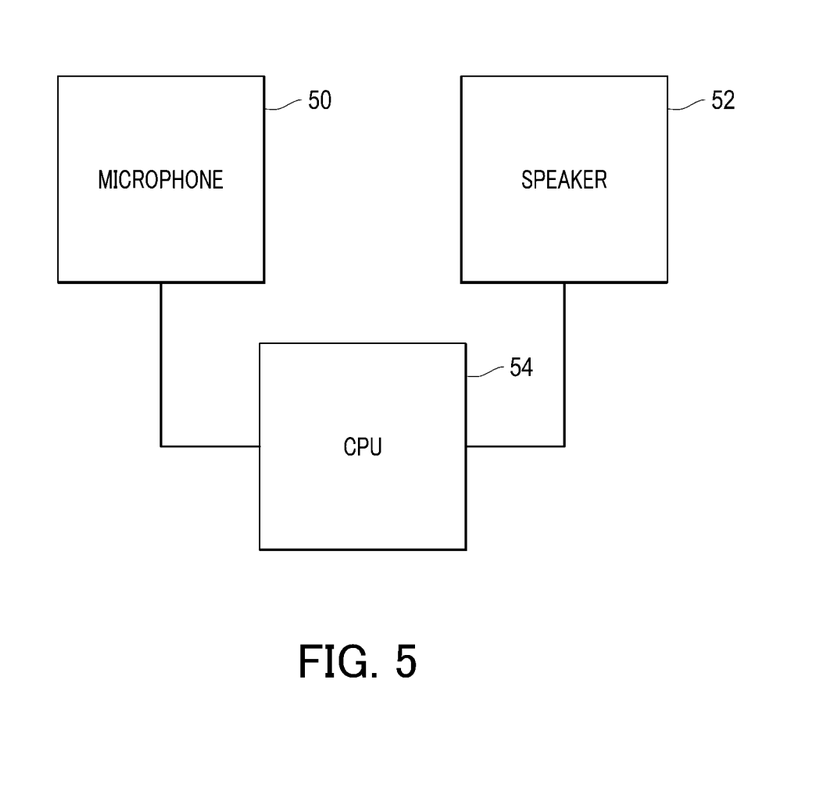
FIG. 5 is a system configuration diagram according to one embodiment.

The voice input/output unit 11 is a unit used to input and output voice. Specifically, voice is converted into an electrical signal (hereinafter, voice data) using a microphone 50. Acquired voice data is output to the voice recognition unit 12 to be described later. In addition, the voice input/output unit 11 uses a speaker 52 to convert voice data transmitted from the controlling unit 15 into voice (see FIG. 5).

The voice recognition unit 12 is a unit which performs voice recognition on the voice acquired by the voice input/output unit 11 and which converts the voice into a text. Voice recognition can be performed using existing techniques. For example, the voice recognition unit 12 stores acoustic models and a recognition dictionary and performs voice recognition by comparing acquired voice data with an acoustic model to extract a feature and matching the extracted feature with the recognition dictionary. Recognition results are transmitted to the controlling unit 15.

The degree-of-intimacy calculating unit 13 is a unit which calculates a degree of intimacy between the robot 10 and a user. The degree-of-intimacy calculating unit 13 stores a value representing a current degree of intimacy for each user in a table format (a degree-of-intimacy table) and, when an utterance is received from a user, calculates a degree of intimacy based on contents of the utterance and on the stored table. The calculated degree of intimacy is transmitted to the response generating unit 14 to be described later and used to generate a response. In addition, the degree-of-intimacy calculating unit 13 updates the degree-of-intimacy table using the calculated degree of intimacy.

Figure 2:
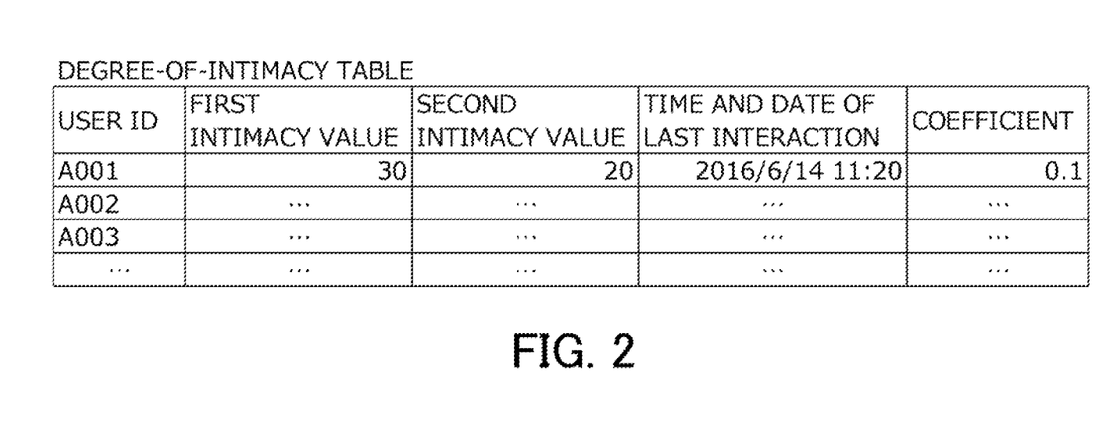
FIG. 2 shows an example of a degree-of-intimacy table according to the first embodiment.

FIG. 9 shows an example of the degree-of-intimacy table stored by the degree-of-intimacy calculating unit 13. The degree-of-intimacy table records, together with a time and date of a last interaction between a user and the robot 10 and a coefficient, a degree of intimacy calculated based on contents of an utterance made by the user (hereinafter, a first intimacy value) and a degree of intimacy calculated based on the number of interactions between the user and the robot 10 (hereinafter, a second intimacy value).

A method of calculating the first and second intimacy values and details of the time and date of a last interaction and the coefficient will be described later.

The response generating unit 14 is a unit which generates a sentence (an uttered sentence) as a reply to a user based on a text output by the voice recognition unit 12 (in other words, contents of an utterance made by the user). For example, the response generating unit 14 may generate a response based on an interaction scenario (an interaction dictionary) stored in advance.

In addition, the response generating unit 14 generates a response by also taking a degree of intimacy calculated by the degree-of-intimacy calculating unit 13 into consideration. Specifically, for example, a response is generated based on an input degree of intimacy such as generating a sentence in a courteous tone when the degree of intimacy is low and generating a sentence in a friendly tone when the degree of intimacy increases Therefore, the response generating unit 14 may be provided with an interaction scenario in accordance with the degree of intimacy.

The response generated the response generating unit 14 is transmitted in a text format to the controlling unit 15 and subsequently output toward the user by a synthesized voice.

The controlling unit 15 is a unit which con roll, as a whole, voice interaction performed by the robot 10. Specifically, the controlling unit 15 executes a function for detecting a presence of an interaction partner (a user) and starting an interaction, a function for causing voice recognition to be executed on an utterance by the user, a function for causing generation of a response sentence to be executed, a function for converting an acquired uttered sentence into voice data and outputting the voice data via the voice input/output unit 11, and the like.

The robot 10 can be configured as an information processing apparatus including a CPU 54 (see FIG. 5), a main storage apparatus, and an auxiliary storage apparatus. The respective units illustrated in FIG. 1 function as a result of a program stored in the auxiliary storage apparatus being loaded onto the main storage apparatus and executed by the CPU 54. Alternatively, all of or a part of the illustrated functions may be executed using exclusively designed circuits.

<Method of Calculating Degree of Intimacy>

Next, a method of calculating a degree of intimacy will be described. The calculation of a degree of intimacy is performed by the degree-of-intimacy calculating unit 13 when the robot 10 receives an utterance from a user. An example will now be described in which, as shown in FIG. 2, a user has a first intimacy value (a degree of intimacy based on utterance contents) of 30 and a second intimacy value (a degree of intimacy based on the number of interactions) of 20. A degree of intimacy recorded in the degree-of-intimacy table is a degree of intimacy as of the present moment (in other words, a degree of intimacy calculated when an interaction had been last performed).

(1) Acquire Amount of Variation in Degree of Intimacy Based on Utterance Contents First, the degree-of-intimacy calculating unit 13 calculates an amount of variation of the first intimacy value (hereinafter, an amount of variation $\alpha$) based on contents of an utterance made by the user. The amount of variation $\alpha$ is a value representing how much the degree of intimacy varies due to a latest utterance made by the user. The calculation of the amount of variation $\alpha$ can be performed by a method such as that described below.

For example, the degree-of-intimacy calculating unit 13 performs a morphological analysis on a text acquired from the voice recognition unit 12 and compares each of the obtained morphemes with a degree-of-intimacy dictionary stored in advance. The degree-of-intimacy dictionary is a list of an increase or decrease amount of the degree of intimacy defined for each keyword, and the amount of variation $\alpha$ of the first intimacy value represents a sum of the increase or decrease amounts of the degree of intimacy corresponding to matching keywords. Moreover, a method of calculating an amount of variation is not limited to the example described above as long as an amount of variation of the degree of intimacy attributable to an utterance by the user can be calculated. In the present example, it is assumed that a value of $\alpha=5$ has been obtained.

(2) Acquire Amount of Variation in Degree of Intimacy Based on Elapsed Time

Next, the degree-of-intimacy calculating unit 13 acquires an amount of variation in the degree of intimacy based on elapsed time. In the present example, t denotes an elapsed time from the time of a previous interaction, A denotes a coefficient defined in the degree-of-intimacy table, and −tA/2 denotes an amount of variation in the degree of intimacy with the passage of time (hereinafter, an amount of variation $\beta$). In other words, the longer the time elapsed from the time of a previous interaction, the greater the decline in both the first and second intimacy values. In the present example, it is assumed that t=10 (time) and A=0.1. In other words, the amount of variation $\beta$ in the degree of intimacy with the passage of time is −tA/2=−0.5.

(3) Calculate First Intimacy Value

Next, $\alpha$ and $\beta$ described above are added to the first intimacy value recorded in the degree-of-intimacy table. Subsequently, the first intimacy value recorded in the degree-of-intimacy table is updated by the obtained value. In the present example, 30+5−0.5=34.5 is the latest first intimacy value.

(4) Calculate Second Intimacy Value

Next, 1 and $\beta$ are added to the second intimacy value recorded in the degree-of-intimacy table. The addition of a value of 1 means that the number of interactions has increased by one. Subsequently, the second intimacy value recorded in the degree-of-intimacy table is updated by the obtained value. In the present example, 20+1−0.5=20.5 is the latest second intimacy value.

(5) Calculate Sum of Degrees of Intimacy

Finally, the first intimacy value and the second intimacy value are added up to obtain a total degree of intimacy. In the present example, 34.5+20.5=55 is the latest degree of intimacy. In other words, an interaction by the user with the robot causes the degree of intimacy to increase from 50 to 55.

<Processing Flow Chart>

Next, specific contents of a process performed by the robot 10 will be described.

Figure 3:
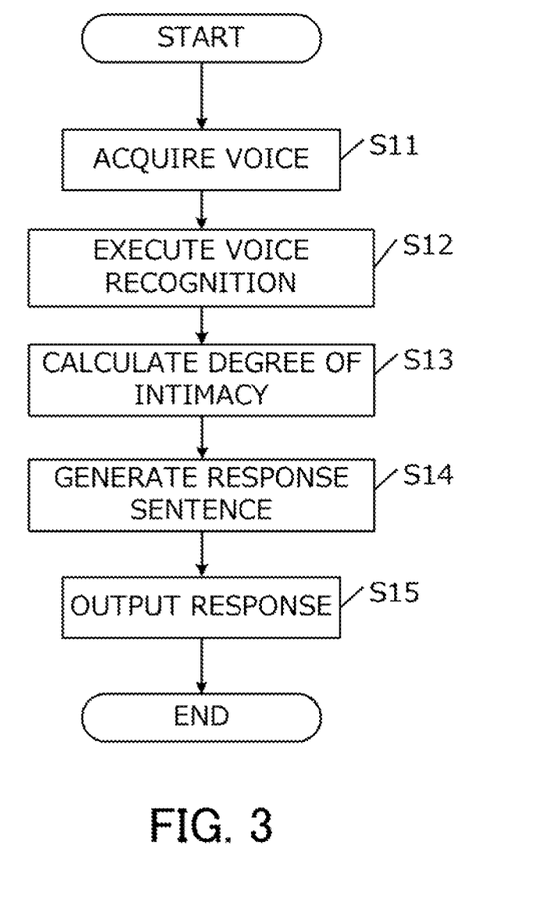
FIG. 3 is a flow chart of a process performed by a robot 10.

First, a process by which the robot 10 and the user interact by voice will be described with reference to the flow chart shown in FIG. 3.

First, in step S11, the voice input/output unit 11 acquires voice from a user through a microphone 50. The acquired voice is converted into voice data and transmitted to the voice recognition unit 12.

Next, the voice recognition unit 12 executes voice recognition on the acquired data (step S12). A text representing a result of the voice recognition is transmitted to the degree-of-intimacy calculating unit 13 and the response generating unit 14.

Next, based on the acquired text and the stored degree-of-intimacy table, the degree-of-intimacy calculating unit 13 calculates a degree of intimacy using the method described earlier (step S13). The calculated degree of intimacy is transmitted to the response generating unit 14.

Next, the response generating unit 14 generates a response sentence based on the text output by the voice recognition unit 12 and the degree of intimacy output by the degree-of-intimacy calculating unit 13 (step S14). The generated response sentence is transmitted to the controlling unit 15.

In addition, in step S14, the controlling unit 15 performs voice synthesis based on the response sentence and outputs the synthesized voice via the voice input/output unit 11.

As described above, in the first embodiment, an amount of variation of the degree of intimacy is calculated and updated based on contents of an utterance made by a user and the number of interactions performed. Accordingly, an effect in which the degree of intimacy varies due to a plurality of contacts can be obtained. In addition, by making corrections to the first intimacy value and the second intimacy value based on an elapsed time from the time of a last interaction, an effect in which the degree of intimacy declines as time elapses can be obtained. In other words, interactions can be performed in a more human-like manner.

Moreover, a degree of decline of the degree of intimacy can be adjusted by a coefficient. Accordingly, a balance can be achieved between an increase in the degree of intimacy due to performing interactions and a decrease in the degree of intimacy due to the passage of time.

(Second Embodiment)

A second embodiment is an embodiment in which functions of the robot according to the first embodiment is distributed between a robot 10 and an interactive server 20.

Figure 4:
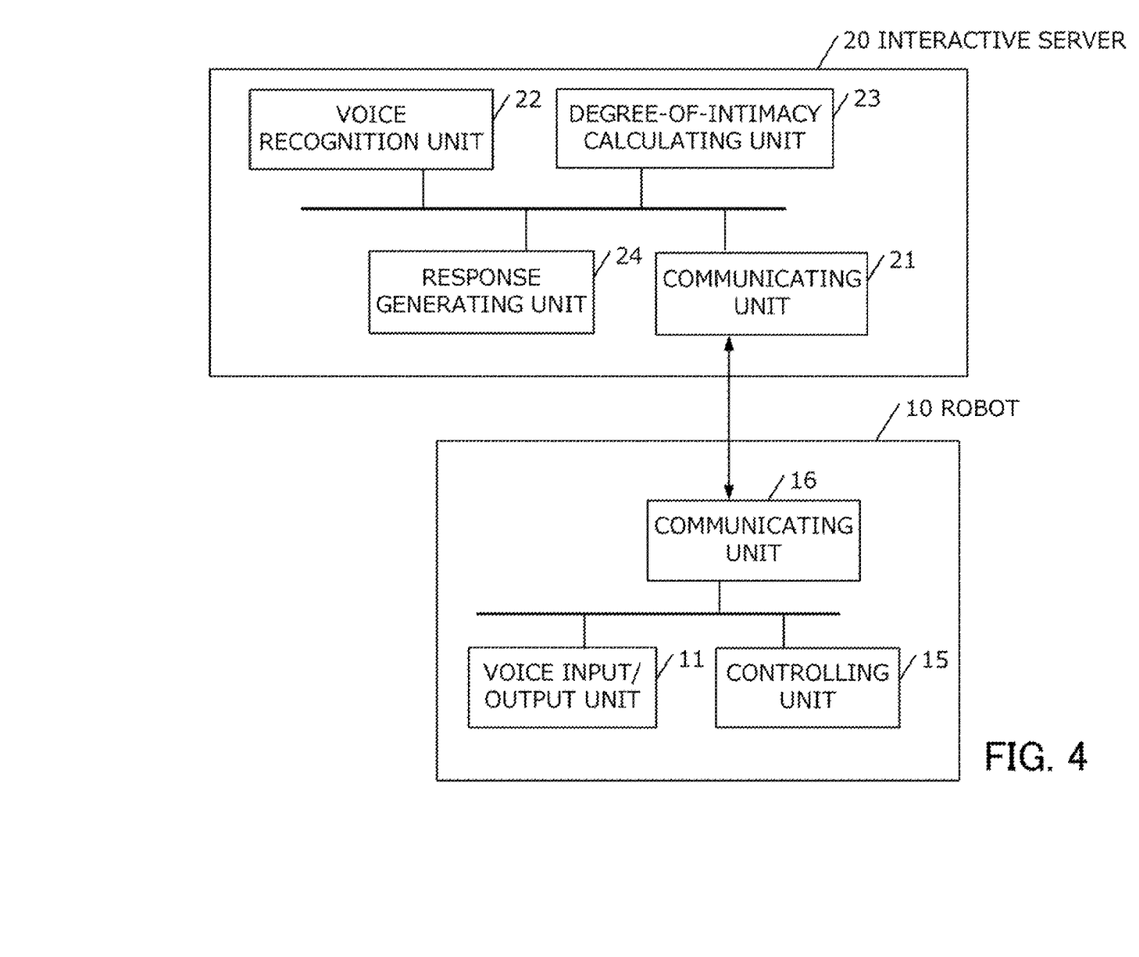
FIG. 4 is a system configuration diagram of an interaction system according to a second embodiment.

FIG. 4 is a system configuration diagram of an interaction system according to the second embodiment. Functional blocks having functions similar to those of the first embodiment will be denoted by the same reference numerals and a description thereof will be omitted In the second embodiment, a response by the robot to a user is generated by the interactive server which includes a communicating unit 21, a voice recognition unit 22 (corresponding to the voice recognition unit 12), a degree-of-intimacy calculating unit (corresponding to the degree-of-intimacy calculating unit 13), and a response generating unit 24 (corresponding to the response generating unit 14). The robot 10 and the interactive server 20 are connected by the communicating unit 21 and a communicating unit 16 to be capable of communicating with each other. For example, a wireless communication network may be used to connect the robot 10 and the interactive server 20 to each other.

In the second embodiment, the robot 10 transmits voice acquired in step S11 to the interactive server 20 and, in step 312, voice recognition is performed at the interactive server 20. In addition, the calculation of a degree of intimacy (step S13) and the generation of a response sentence (step S14) are executed by the interactive server 20. The generated response sentence is transmitted to the robot 10 and output by synthesized voice in a similar manner to the first embodiment.

Moreover, while voice synthesis is performed by the robot 10 in the present example, alternatively, voice synthesis maybe performed by the interactive server 20.

(Modification)

The embodiments described above merely represent examples and the present invention can be implemented with various modifications without departing from the spirit and scope of the invention.

For example, while 1 is added to the second intimacy value every time the number of interactions increases by one in the description of the embodiments, alternatively, a value other than 1 may be added. In addition, when contents of an utterance are negative, addition may not be performed or an arbitrary value may be subtracted.

What is claimed is:

1. A voice interactive device that interacts with a user by voice, the device comprising:
    a microphone that acquires a voice uttered by a user;
    a processor configured to:
        recognize the acquired voice;
        calculate a first intimacy value by identifying a keyword in the voice;
        calculate a second intimacy value derived from a number of previous interactions between the user and the voice interactive device;
        calculate a degree of intimacy with between the user and the voice interactive device using a sum of the first intimacy value and the second intimacy value; and
        generate a response to the recognized voice using the degree of intimacy; and
    a speaker that outputs the response by voice.

2. The voice interactive device according to claim 1, further comprising:
    a storage unit that stores the calculated degree of intimacy, wherein when an utterance is received from the user, the processor calculates an amount of variation of the degree of intimacy attributable to the utterance and updates the first intimacy value and the second intimacy value.

3. The voice interactive device according to claim 2, wherein
    the processor is further configured to identify the user, and
    the storage unit stores the degree of intimacy for each of a plurality of users.

4. The voice interactive device according to claim 2, wherein the processor is further configured to correct an amount of variation of the first intimacy value or the second intimacy value based on an elapsed time since last contact with the user.

5. A voice interactive method performed by a voice interactive device interacting with a user by voice, the voice interaction method comprising:
    acquiring a voice uttered by a user using a microphone;
    recognizing the acquired voice using a processor;
    calculating a first intimacy value by identifying a keyword in the voice, using the processor;
    calculating a second intimacy value derived from a number of previous interactions between the user and the voice interactive device, using the processor;
    calculating a degree of intimacy between the user and the voice interactive device using a sum of the first intimacy value and the second intimacy value, using the processor;
    generating a response to the recognized voice using the degree of intimacy, using the processor; and
    outputting the response by voice, using a speaker.

6. An interaction system comprising a voice interactive device and an interactive server,
    the voice interactive device including:
        a microphone that acquires a voice uttered by a user;
        a device-side communicator that transmits the acquired voice to the interactive server and acquires a response to the acquired voice from the interactive server; and
        a speaker that outputs the response by voice; and
    the interactive server including:
        a processor configured to:
            recognize the acquired voice;
            calculate a first intimacy value by identifying a keyword in the voice;
            calculate a second intimacy value derived from a number of previous interactions between the user and the voice interactive device;
            calculate a degree of intimacy between the user and the voice interactive device using a sum of the first intimacy value and the second intimacy value; and
            generate a response to the recognized voice using the degree of intimacy; and
        a server-side communicator that transmits the response to the voice interactive device.

* * * * *